United States Patent [19]

Confer

[11] Patent Number: 5,244,291
[45] Date of Patent: Sep. 14, 1993

[54] MEANS AND METHOD OF ATTACHMENT OF HOLLOW THIN-WALLED STRUCTURAL MEMBERS

[75] Inventor: Raymond C. Confer, Amherst, N.Y.

[73] Assignee: Confer Plastics Inc., Tonawanda, N.Y.

[21] Appl. No.: 749,908

[22] Filed: Aug. 26, 1991

[51] Int. Cl.$^5$ .......................... E06C 7/00; A47B 96/00
[52] U.S. Cl. .................................. 403/374; 403/319
[58] Field of Search .................... 403/319, 381, 374

[56] References Cited

U.S. PATENT DOCUMENTS

| | | |
|---|---|---|
| 1,345,206 | 6/1920 | McBride . |
| 1,989,123 | 7/1935 | Weimer . |
| 2,615,503 | 10/1952 | Enge . |
| 2,673,775 | 3/1954 | Silverman . |
| 2,896,831 | 7/1959 | Ellingson . |
| 3,009,532 | 11/1961 | Richard et al. . |
| 3,279,831 | 10/1966 | Smelcer et al. . |
| 3,572,785 | 3/1971 | Larson . |
| 3,908,795 | 9/1975 | Gannon . |
| 3,914,061 | 10/1975 | Meyer . |
| 3,971,186 | 7/1976 | Havelka et al. . |
| 4,023,647 | 5/1977 | Confer . |
| 4,067,614 | 1/1978 | Confer et al. . |
| 4,166,833 | 9/1979 | Shurman . |
| 4,190,115 | 2/1980 | Couture . |

FOREIGN PATENT DOCUMENTS

| | | | |
|---|---|---|---|
| 933722 | 9/1973 | Canada ................................. | 403/381 |
| 335778 | 10/1989 | European Pat. Off. ............ | 403/319 |

Primary Examiner—Randolph A. Reese
Assistant Examiner—Anthony Knight
Attorney, Agent, or Firm—Hodgson, Russ, Andrews, Woods & Goodyear

[57] ABSTRACT

A pair of structural members are releasably attached by providing an interlocking attachment of a boss on one member with a cavity in another member so that respective walls of the boss and cavity engage each other whereby a space is left between respectively opposed walls of the boss and cavity. A spacer is provided in the space between the opposed walls to maintain the interlocking attachment of the boss in the cavity. The spacer is maintained in position to prevent its inadvertent removal from the case by a detent which engages an indentation.

20 Claims, 2 Drawing Sheets

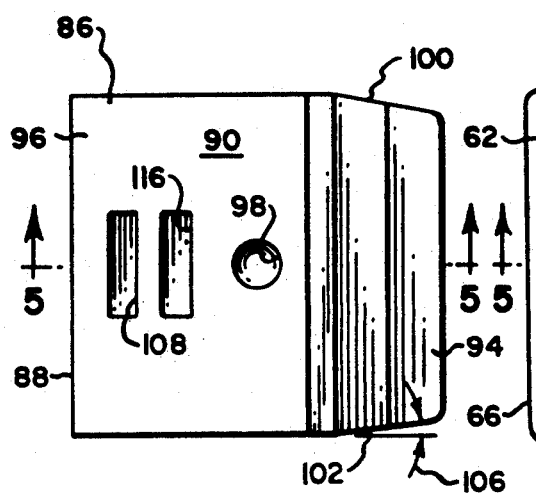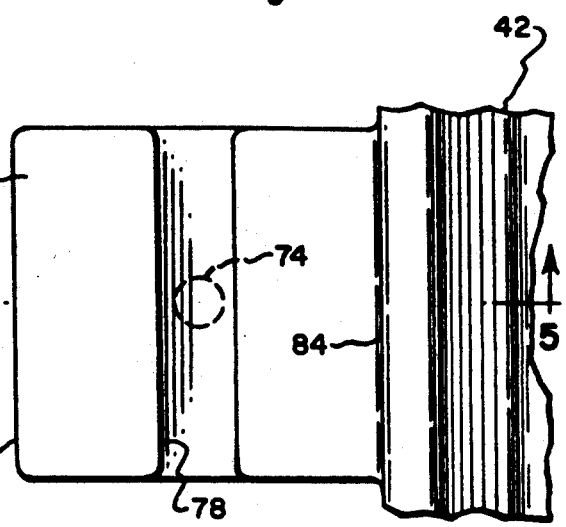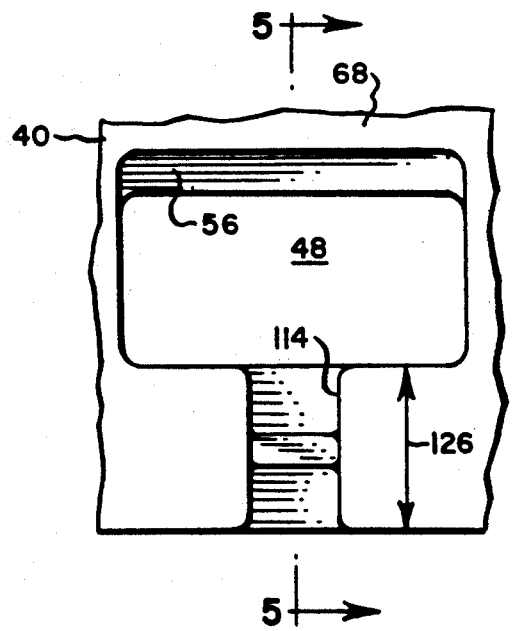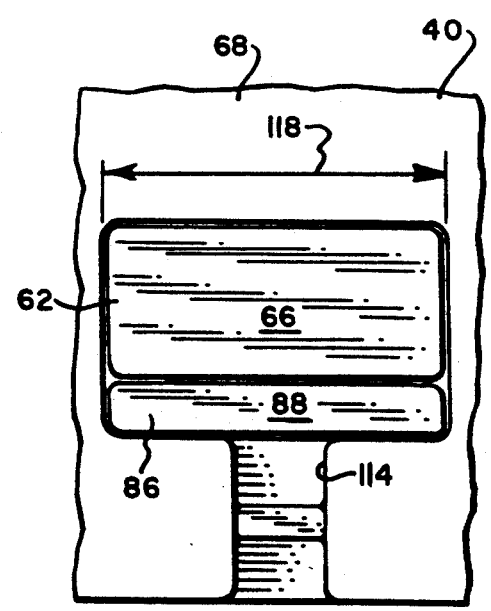

MEANS AND METHOD OF ATTACHMENT OF HOLLOW THIN-WALLED STRUCTURAL MEMBERS

The present invention relates generally to the attachment of a pair of structural members. While the present invention will be described in connection with the attachment of hollow thin-walled structural members such as those that are blow-molded, it should be understood that the present invention may be used for the attachment of various other structures.

Various means for attaching structural members are exemplified in the following U.S. patents:

| | |
|---|---|
| 4,190,115 | Couture |
| 3,971,186 | Havelka et al |
| 3,914,061 | Meyer |
| 3,908,795 | Gannon |
| 3,572,785 | Larson |
| 3,279,831 | Smelcer et al |
| 3,009,532 | Richard et al |
| 2,896,831 | Ellingson |
| 2,673,775 | Silverman |
| 2,615,503 | Enge |
| 1,989,123 | Weimer |
| 1,345,206 | McBride |

Swimming pool ladders, footstools, chairs, and various other objects have been made from a plastic material by a process known as "blow molding", as exemplified by U.S. Pat. Nos. 4,023,647 to Confer, 4,067,614 to Confer et al, and 4,166,833 to Schurman, all of which patents are hereby incorporated herein by reference. In the process of blow molding, a hollow thin-walled structure is formed. These objects may require a number of structural members to be blow molded and then attached together, as shown in Confer.

With the blow molded structures having relatively thin walls, it is difficult to use standard mechanical fasteners for attachment thereof.

One means of attachment of a pair of such blow-molded structural members is shown in FIG. 10 of Confer wherein a first member is inserted in a W-shaped recess of a second member. The first member has an integrally formed hook member projecting outwardly from each of its lateral surfaces proximate its lowermost open end to snap into and be received in transversely extending openings of the recess. A reinforcing insert is inserted into the hollow first member to strengthen it and to resist flexure thereof While such an attachment means provides a suitable connection between a pair of structural members, it nevertheless requires control over the wall thickness. The control of wall thickness during blow molding is difficult.

It is accordingly an object of the present invention to provide a means and method for attachment of a pair of blow-molded or other hollow thin-walled structures which does not require such wall thickness control so that the manufacture of the structural members may be a less complex procedure.

It is a further object of the present invention to provide such an attachment means which is rugged and provides a secure attachment yet is easy to assemble and disassemble.

In order to provide a means of attachment between a pair of hollow thin-walled structural members as well as other structural members, in accordance with the present invention a first structural member has a cavity in which is inserted a boss of a second structural member. The boss and cavity have mating projecting means and recess means in first wall portions thereof whereby the boss may be inserted into the cavity and into an interlocking relationship, and means are provided which are insertable between second wall portions of the boss and cavity, which are opposite the first wall portions respectively, for retaining such interlocking relationship whereby the wall thickness of the structural members need not be carefully controlled in order to provide a secure attachment thereof.

The above and other objects, features, and advantages of the present invention will be apparent in the following detailed description of the preferred embodiments thereof which is to be read in connection with the accompanying drawings.

BRIEF DESCRIPTION OF THE DRAWINGS

FIG. 2 is a side view of a portion of a first structural member showing a cavity therein in accordance with the present invention.

FIG. 3 is a top view of a portion of a second structural member showing a boss for insertion in the cavity of the first structural member of FIG. 2 in accordance with the present invention.

FIG. 4 is a top view of a retaining member which is also insertable in the cavity of the first structural member in accordance with the present invention.

FIG. 6 is a side view of the assembly of FIG. 5.

DETAILED DESCRIPTION OF THE PREFERRED EMBODIMENTS

Figure 1:
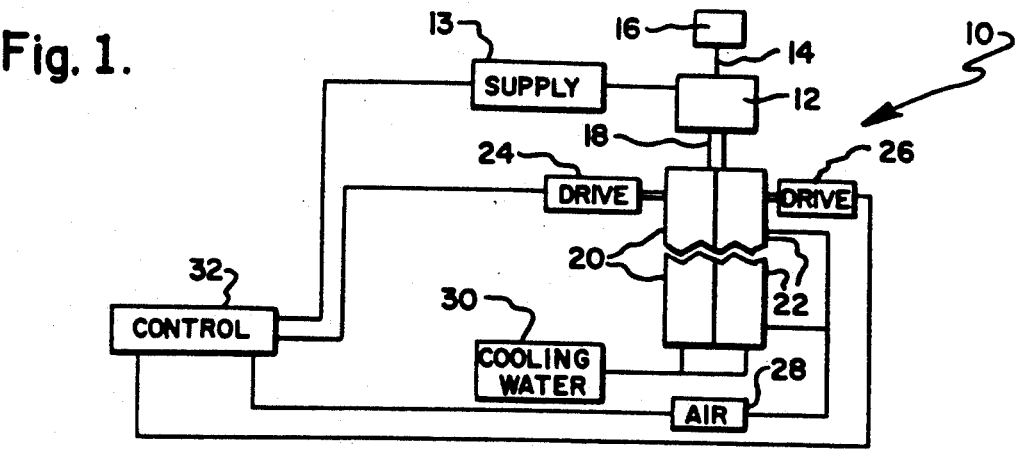
FIG. 1 is a schematic view of apparatus used in blow-molding structural members.

Referring to FIG. 1, there is illustrated generally at 10 a process and apparatus for blow-molding articles such as those shown in the aforesaid Confer, Confer et al, and Schurman patents. For example, structural members manufactured by the blow-molding apparatus may comprise a deck and a pair of hand rails which are attachable thereto to form a swimming pool ladder. In accordance with the process illustrated in FIG. 1, molten thermoplastic material is fed into an extrusion die 12 of known type by conventional feed means (not shown) from a suitable supply 13. A lift member 14 driven by a suitable motor 16 can be used to adjust the die 12 to extrude a parison 18 which provides thin walls to the resulting structural member. The extruded parison 18 is passed between a pair of mold sections 20 and 22 which are mounted for movement into and out of engagement about the parison 18 by suitable drive means 24 and 26 respectively. In carrying out the process of the invention, mold sections 20 and 22 are engaged about the parison 18, trapping a portion of the parison between them and having meeting surfaces which pinch the extraneous parison portions, creating the mold line. Compressed air from a suitable source 28 is introduced into the trapped portion in a known manner to expand it against the mold surfaces to form the molded part of hollow double-walled construction. The spaces between the mold surfaces and the trapped parison portion are vented, all in a manner well understood in the art. Cooling water from source 30 can be circulated through passages (not shown) in the mold sections, and the mold apparatus can be controlled in a timed manner by means, illustrated at 32, well known and understood in the art and therefore only schematically indicated in FIG. 1. The process and apparatus for blow molding to form hollow thin-walled structural members are thus well known to those of ordinary skill in the art to which this invention pertains.

Referring to FIGS. 2 and 3, there are shown at 40 and 42 respectively first and second structural members respectively which are composed of a suitable plastic material by the use of the blow molding process illustrated in FIG. 1 and which are provided with means, which will be described in greater detail hereinafter, for releasably attaching the structural members 40 and 42 together. The structural members 40 and 42 may be parts of a swimming pool ladder, a footstool, a chair, or any other suitable structure. The first structural member 40 may be one of two hand rails for a swimming pool ladder, and the second structural member 42 may be a deck to which the hand rails are attached. For another example, the structural members 40 and 42 may, when attached together, comprise a footstool such as that shown in the Confer et al patent. For a third example, structural members 40 and 42 may comprise portions of a chair.

Figure 5:
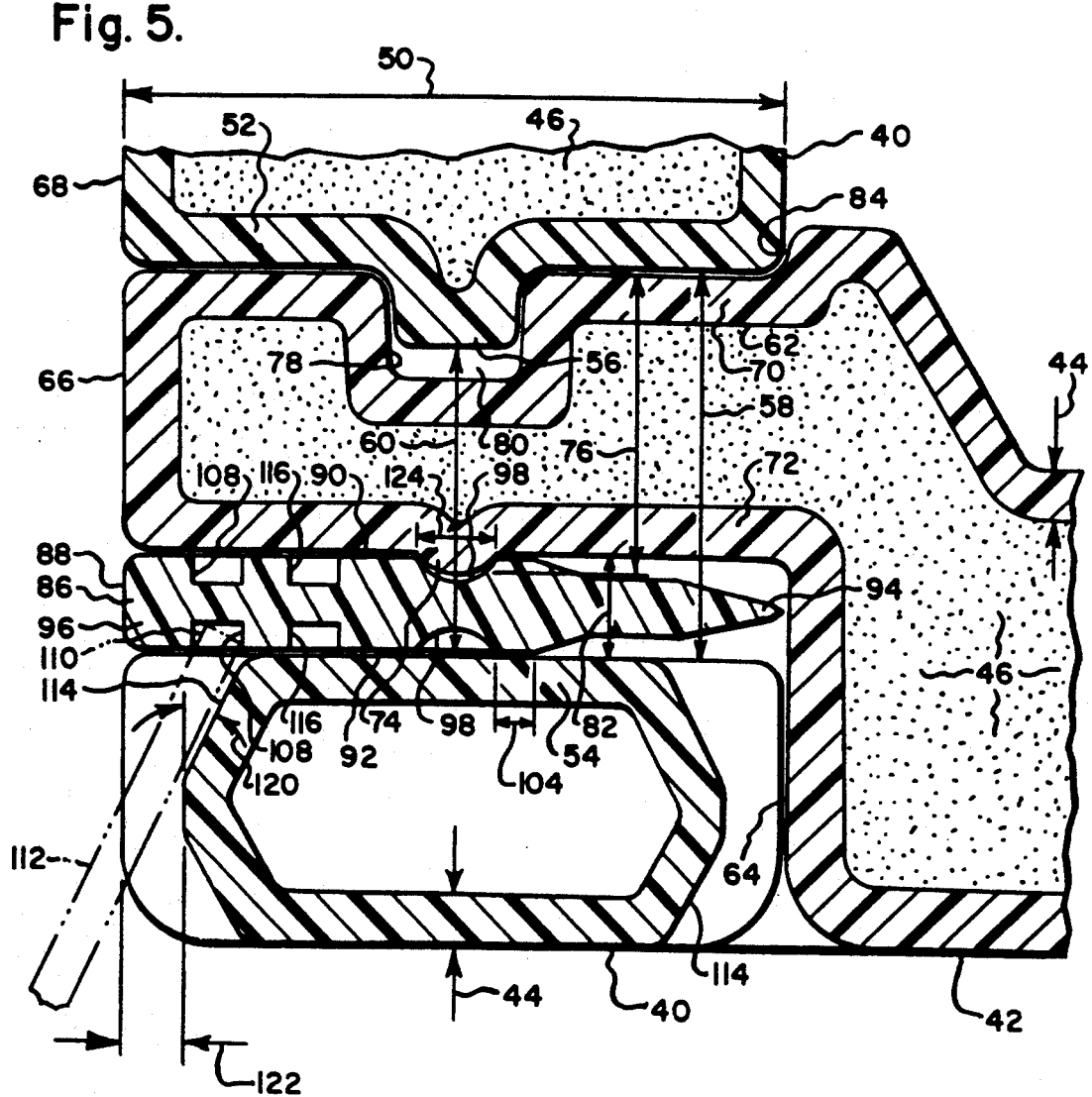
FIG. 5 is a sectional view illustrating the assembly of the first and second structural members and retaining member of FIGS. 2, 3, and 4 respectively and taken along lines 5—5 of FIGS. 2, 3, and 4.

As best seen in FIG. 5, typical of blow-molded articles, the structural members 40 and 42 are hollow thin-walled members, i.e., the walls may have a thickness, illustrated at 44, which may of course vary with the particulars of the blow molding process used and the size and strength required for the particular structural members. When the thickness 44 is less than about ⅛ inch, the use of standard fasteners for attachment of the walls becomes more difficult. Due to difficulties of controlling wall thickness during blow molding, this thickness 44 may vary appreciably, perhaps doubling, in a structural member. However, for known blow molding processes this thickness 44 is generally less than ¼ inch, i.e., in the neighborhood of about ⅛ inch, but could be as much as about ⅜ inch or more. For the purposes of this specification and the claims, the term "thin-walled" is meant to refer to a wall thickness which is less than about ⅜ inch. The thin walls leave a substantial hollow space within the structural member. As needed, the hollow interior of the structural members 40 and 42 may be filled with a suitable filler material 46 such as, for example, sand or foam, to add weight and/or strength thereto and/or provide internal rigidity.

While the connecting means including the reinforcing insert which is inserted between the thin walls of a structural member of FIG. 10 of Confer provides a suitable connection between a pair of structural members, it nevertheless requires careful control over the wall thickness. As previously discussed, the control of wall thickness during blow molding is difficult. The control of wall thickness during any other procedures for making thin-walled hollow members may also be difficult. In order to provide a structural connection between the pair of structural members 40 and 42 which does not require such careful wall thickness control so that blow molding thereof may be more easily achieved, in accordance with the present invention the structural members 40 and 42 are provided with connecting means as hereinafter described.

Referring to FIGS. 2 and 5, the first structural member 40 includes at least one cavity 48 extending entirely through a thickness 50 thereof. As shown, the cavity 48 may be rectangular in cross-section, but it may have any other suitable cross-sectional shape such as perhaps circular. The cavity 48 has a pair of opposed or opposite wall portions, i.e., a first wall portion 52 and a second wall portion 54. Thus, in cross-section, the wall portions 52 and 54 would define opposite sides of a rectangle. If, on the other hand, the cavity 48 were circular in cross-section, a portion thereof extending over a cross-sectional arc up to 180° would constitute a first wall portion, and an opposed portion extending over an equal cross-sectional arc would constitute a second wall portion. The first wall portion 52 is shaped or follows a course, as shown in FIG. 5, to define a projecting portion 56 which extends or projects radially inwardly of the cavity 48 and, as shown in FIG. 2, extends transversely to the structural member width 50 preferably entirely across the cavity 48. The projecting portion 56 is shown to be generally rectangular in section but may have any other suitable shape, and may be located, for example, about midway of the width 50 of the first structural member 40, as shown in FIG. 5, or any other suitable location. The distance between the first and second walls 52 and 54 is illustrated at 58, and the distance between the projecting portion 56 and the second wall 54 is illustrated at 60, the distance 60 being substantially less than the distance 58.

Referring to FIGS. 3 and 5, the second structural member 42 includes at least one boss 62 extending from a side 64 thereof. The length of the boss 62 is preferably equal to the cavity length 50 so that its end 66 is flush with a side 68 of the first structural member 40. The boss 62 is shaped in section so as to conform generally to the shape in section of the cavity 48 for insertion therein. It has first and second opposed or opposite walls 70 and 72 respectively which conform generally to the opposed cavity walls 52 and 54 respectively for engagement of the first cavity wall 52 by the first boss wall 70. The second boss wall 72 is shaped to define a generally circular portion or button 74 protruding from the outer surface thereof generally centrally thereof. Its purpose will be discussed hereinafter. The distance between the first and second boss walls 70 and 72 respectively, i.e., the distance between the outer surface of the first boss wall 70 and the outer tip of the button 74, is illustrated at 76. Although the projecting portion 56 and recess 78 are integral with and form parts of the walls 52 and 70 respectively, where applicable herein such as in defining distance between walls, the walls 52 and 70 are defined as not including the projecting portion 56 and recess 78 respectively. The boss 62 is sized such that distance 76 is equal to or slightly less than distance 60 so that the boss may be received within the cavity 48. The first wall 70 of the boss 62 is shaped or follows a course, as shown in FIG. 5, to define a recess 78 therein which is shaped generally to conform to the shape of projecting portion 56 so that the projecting portion is received entirely in the recess 78 so that the first wall portions 52 and 70 may engage each other. The depth of the recess 78 is preferably greater than necessary to receive the projecting portion 56 thereby leaving a space 80 therebetween for ensuring engagement of the first wall portions 52 and 70.

The receipt of the projecting portion 56 into the recess 78 so that the first wall portions 52 and 70 engage each other provides an interlocking relationship between the structural members 40 and 42 and results in a spacing illustrated at 82 between the second wall portions 54 and 72, i.e., between the outer surface, exclusive of the button surface, of the boss second wall portion and the cavity second wall portion. The second structural member 42 preferably has surfaces 84 and 64 extending generally perpendicularly to both of the boss wall portions 70 and 72 respectively to ensure correct positioning between the structural members 40 and 42.

In order to ensure the interlocking connection of the structural members 40 and 42 so that they do not become inadvertently disengaged by movement of the boss 62 into the space 82 to disengage from the projecting portion 56, in accordance with the present invention a spacer 86 or other suitable retaining means is inserted between the second wall portions 54 and 72 to fill the space therebetween. The spacer 86 has a depth equal substantially to the distance 82 so as to snugly or tightly fit within the space between the second wall portions 54 and 72 and preferably has a length and width to substantially conform to the dimensions of the space between the second wall portions, i.e., a length equal substantially to distance 50 and a width equal substantially to the length of the projecting portion 56. Thus, the spacer 86 is preferably sized to fit between the second wall portions 54 and 72 so that its end surface 88 is generally flush with or in alignment with the boss end surface 66 and first structural member side surface 68 so that it on the one hand does not protrude therefrom and on the other hand is not "buried" within the cavity 48. The spacer 86 may be composed of any suitable material such as, for example, a plastic material similar to that of which the structural members 40 and 42 are composed, and it may be either hollow or solid and need not be manufactured by the blow-molding process. For example, the spacer 86 may be compression molded.

The spacer 86 has upper and lower surfaces 90 and 92 respectively for engaging the boss second wall portion 72 and the cavity second wall portion 54 respectively. The spacer 86 also has a leading or insertion end portion 94 and a following or trailing end portion 96. An indentation 98 is centrally or otherwise suitably provided in the upper spacer surface 90. Indentation 98 is shaped and positioned to conform to the shape of the button 74 to receive the button 74 when the spacer 86 is fully inserted whereby a prying force will be desirably required to remove the spacer so that it is not inadvertently dislodged from between the second wall portions. The button 74 and indent 98 are thus preferably sized so that a desirable moderate amount of force is required to insert and to remove the spacer 86 so that it may be inserted and removed easily but not inadvertently. An example of such sizing is provided hereinafter.

The spacer leading end portion 94 is wedge-shaped both along its upper and lower surfaces 90 and 92 respectively and its side surfaces 100 and 102 in order to more easily initiate the insertion thereof as well as to ease the button 74 into secure engagement with the indent 98. Thus, beginning a short distance illustrated at 104 toward the leading end from the indent 98, the upper and lower surfaces 90 and 92 respectively slant toward each other until the distance therebetween is such that they easily clear the button 74, then extend generally parallel to each other for a distance afterwhich they again slant toward each other thereby defining a tip at the leading end. Alternatively, the surfaces 90 and 92 may slant toward each other over the entire distance to the tip beginning a short distance from the indent to thereby simplify the manufacture thereof. It should be understood that the leading end portion 94 may be otherwise suitably shaped. As seen in FIG. 4, the side surfaces 100 and 102 also preferably slant toward each other, also beginning a short distance 104 from the indent, as they extend toward the tip.

The thin walls of the structural members may have some flexing capacity to allow insertion of the spacer 86 with a moderate amount of force for lockingly attaching the structural members with the button 74 received within the indent 98. Likewise, a moderate amount of force is also desirably required to remove the spacer 86 so that the structural members 40 and 42 may be disconnected. In order to provide for easy but not inadvertent removal of the spacer 86, in accordance with a preferred embodiment of this invention at least one slot 108 is provided in the lower surface 92 of the spacer in the trailing end portion 96 thereof for receiving the tip illustrated at 110 of a prying member 112 such as a screwdriver. A groove 114 is provided in the side surface 68 of the first structural member to extend to the slot 108, in alignment therewith when the spacer 86 is fully inserted, for receiving the prying tool 112 so that the prying tool may be inserted therein with its tip inserted into the slot 108 so that the necessary moderate force may be easily applied to pry the spacer 86 a distance out of the space between the second wall portions, disengaging the button 74 from the indent 98, afterwhich the spacer 86 may be grabbed by one's fingers for removal therefrom. The groove 114, i.e., the groove bottom, may, for example, extend from adjacent the slot 108 outwardly toward surface 68 at an acute angle illustrated at 120 to afford suitable leverage to the prying tool afterwhich it may extend generally parallel to surface 68 for a short distance and then extend inwardly at an opposed angle which may be the same as angle 120, to increase the amount of movement of the spacer which may be achieved with the prying member inserted in the slot 108. If necessary or desired, a second slot 116, similar to the first slot 108, may be provided in the lower surface 92 between the first slot 108 and the indent 98 to allow further prying force for further removal of the spacer after it has been partially removed by use of the tool in the first slot 108.

In order to permit the insertion of the spacer 86 so that either the upper or lower surface may face the second boss wall portion 72 to eliminate the possibility of the spacer being incorrectly inserted, both the upper and lower surfaces 90 and 92 respectively of the spacer are provided with an indent 98 and with slots 108 and 116. Thus, the upper and lower spacer surfaces 90 and 92 respectively are substantially identical so that the spacer 86 may be inserted with either of its upper and lower surfaces facing the boss second wall portion 72 so that it cannot be incorrectly inserted.

In order that the boss 62 may be inserted from either side of the cavity 48 to allow greater interchangeability of structural members, a second groove 114 is preferably provided on the other side of the first structural member 40 to allow the spacer 86 to be pried out and removed from either side. This preferred embodiment of course requires that the button 74, projecting portion 56, and recess 78 be symmetrical and centrally located, as shown in FIG. 5.

The connecting means of the present invention can be embodied in other ways than as shown. For example, the projecting portion 56 may be provided on the boss 62 and the recess 78 provided in the surface of the cavity 48. For another example, the button 74 may be provided on the spacer 86 and the indent 98 provided in the boss second wall portion 72 with both of the second wall portions suitably tapered. While the grooves 114 are illustrated as being provided in the first structural member 40, it should be understood that they may alternatively or additionally be provided in the second structural member 42.

The following example of a suitable connecting means for structural members 40 and 42 in accordance with the present invention is provided for purposes of illustration and not for the purposes of limitation. The structural members 40 and 42 are, for example, blow molded from a plastic material to form a pair of hand rails and a deck respectively for a swimming pool ladder such as shown in FIG. 1 of the Confer patent. Each of the first structural members 40 thus may have a second cavity 48 therein for receiving a second boss 62 on the second structural member 42. On the opposite side of the second structural member 42 there may be provided a second pair of bosses 62 to be received in cavities 48 of the other first structural member 40. The width 50 of the first structural member 40 at the cavity is perhaps 1.75 inches. The cavity 48 extends entirely through the width of the first structural member 40. The cavity 48 may be rectangular in cross-sectional shape and have a cross-sectional length illustrated at 118 of perhaps 1.620 inches. The distance 58 between the cavity wall portions 52 and 54 may perhaps be 1.0 inch. The projecting portion 56 is provided centrally of the first cavity wall portion 52, has a width of perhaps 0.400 inch and the side walls thereof may taper inwardly at a small angle of perhaps 5° so that it may more easily be received in the recess 78, that is, as the walls of the projecting portion extend into the recess, they tend to converge toward each other. The projecting portion extends inwardly from the surface of the first wall portion 52 a distance of perhaps 0.200 inch whereby the distance 60 is perhaps 0.800 inch. The boss 62 extends over a length equal to distance 50 and over a cross-sectional length equal approximately to distance 118 to snugly fit within the cavity 48. The distance between the outer surfaces of the wall portions 70 and 72, exclusive of the depth of the button 74, is perhaps 0.750 inch leaving a distance between the second wall portions, when the boss is inserted in the cavity with the first wall portions in engagement, of approximately 0.250 inch. The recess 78 is shaped to generally conform to and receive the projecting portion 56 and extends inwardly of the boss 62 a distance of perhaps 5/16 inch to provide the space 80, thus having a depth of perhaps about 0.1125 inch, therebetween. The spacer 86 may be composed of a solid plastic material, have a length equal substantially to distance 50, a cross-sectional length equal substantially to distance 118, and have a cross-sectional width equal to perhaps 0.250 inch in order to fit snugly and tightly within the space between the second wall portions 54 and 72. Its sides 100 and 102 may taper inwardly at an angle 106 of perhaps about 1°. Its upper and lower sides may extend from the indent 98 toward the leading end portion a distance 104 of perhaps 0.1 inch, then taper at a small angle toward each other of perhaps 10°, then extend parallel to each other with the distance therebetween being perhaps 0.1 inch for distance of perhaps 0.2 inch, then taper toward each other to the tip. Each of the slots 108 and 116 may be centrally located between the sides 100 and 102 of the spacer 86 and have a length of perhaps 0.5 inch, a width of perhaps 0.1 inch, and a depth of perhaps 1/16 inch. Slot 108 may be spaced from the spacer end surface 88 a distance of perhaps 0.2 inch, and the slots 108 and 116 may be spaced apart a distance of perhaps 0.1 inch. In order to prevent inadvertent disassembly while allowing ease of assembly and disassembly, the button 74 may have a diameter, illustrated at 124, of perhaps 3/16 inch and a depth of perhaps 1/16 inch with the indent 98 being sized to substantially conform thereto. The groove 114, i.e., the groove bottom, may extend from the second cavity wall surface toward the surface 68 at an angle 120 of perhaps 30° to a point where it has a depth 122 of perhaps 0.150 inch, thereafter maintain a constant depth for a short distance and then extend inwardly at an opposed angle of perhaps 30°. The distance illustrated at 126 in FIG. 2 is perhaps 0.7 inch.

The wall thickness 44 of both of the structural members 40 and 42 may be perhaps ⅛ inch but may vary somewhat perhaps to as much as ¼ inch throughout the structural members due to the previously discussed difficulties in control of wall thickness during blow molding. However, such imprecision in wall thickness control advantageously does not affect the quality of the connecting means, as is clearly evident in FIG. 5.

Thus, there is provided in accordance with the present invention a means for connecting two thin-walled structural members so that careful control of wall thickness is not required whereby the blow-molding process for manufacture thereof may be more easily carried out. The attachment means is provided for both ease of attachment and ease of disassembly without the structural members becoming inadvertently disassembled.

It is to be understood that the invention is by no means limited to the specific embodiments which have been illustrated and described herein and that various modifications thereof may indeed be made which come within the scope of the present invention as defined by the appended claims.

What is claimed is:

1. Apparatus comprising first and second structural members and means for releasably attaching said structural members, the attaching means comprising at least one cavity means having fist and second opposed wall portions in said first structural member, a boss having a pair of first and second opposed wall portions on said second structural member, said boss being receivable in said cavity means with said cavity first wall portion adjacent said boss first wall portion, a projecting means on one of said first wall portions, a recess means in the other of said first wall portions for receiving said projecting means thereby spacing said second wall portions apart, means insertable between said second wall portions for retaining said projecting means in said recess means, and means for retaining said insertable means between said second wall portions, wherein said insertable means comprises a member sized for being wedgingly received between the second wall portions when said projecting means is received in said recess means, and wherein said means for retaining said insertable means between the second wall portions comprises indent means and a detent means matingly receivable in said indent means, said insertable means having one of said indent means and said detent means, and one of said structural members having the other of said indent means and said detent means.

2. Apparatus according to claim 1 further comprising means for prying said insertable means from between the second wall portions whereby the attachment of said structural members may be released.

3. Apparatus according to claim 2 wherein said insertable means member has first and second opposed sides for engaging said second wall portions, one of said one of said indent means and said detent means which said insertable means has being in each of said first and second opposed sides of said insertable means member, and said prying means comprising at least one slot means in each of said first and second opposed sides of said insertable means member whereby the insertable means member may be inserted with either of its first and second opposed sides facing the boss second wall portion.

4. Apparatus according to claim 1 wherein said cavity means includes said projecting means which projecting means projects inwardly of said cavity means from said cavity means first wall portion, and said boss includes said recess means.

5. Apparatus according to claim 1 wherein said first wall portions are shaped to follow courses which define respectively said projecting means and said recess means.

6. Apparatus comprising first and second structural members and means for releasably attaching said structural members, the attaching means comprising at least one cavity mans having first and second opposed wall portions in said first structural member, a boss having a pair of first and second opposed wall portions on said second structural member, said boss being receivable in said cavity means with said cavity first wall portion adjacent said boss first wall portion, a projecting means on one of said first wall portions, a recess means in the other of said first wall portions for receiving said projecting means thereby spacing said second wall portions apart, means insertable between said second wall portions for retaining said projecting means in said recess means, and means for retaining said insertable means between said second wall portions, the apparatus further comprising means for prying said insertable means from between the second wall portions whereby the attachment of said structural members may be released, and said prying means comprises at least one slot means in said insertable means member for receiving a tip of a prying tool and a groove means in one of said structural members defining a passage for a prying tool to said slot means and providing support to the prying tool for prying said insertable means member from between the second wall portions.

7. Apparatus according to claim 6 wherein said prying means comprises at least two of said slot means which are spaced apart whereby, after the insertable means member is pried a distance with the prying tool tip inserted in one of the slot means, the prying tool tip may be inserted in another of the slot means for prying the insertable means member a further distance.

8. Apparatus according to claim 6 wherein said insertable means member is sized to be received between the second wall portions such that said insertable means member is disposed entirely within said cavity means whereby said insertable means member does not protrude from said cavity means.

9. Apparatus according to claim 6 wherein said first and second structural members are hollow thin-walled members.

10. Apparatus according to claim 9 wherein said first and second structural members are composed of a blow-molded material.

11. Apparatus comprising first and second structural members and means for releasably attaching said structural members, the attaching means comprising at least one cavity mans having first and second opposed wall portions in said first structural member, a boss having a pair of first and second opposed wall portions on said second structural member, said boss being receivable in said cavity means with said cavity first wall portion adjacent said boss first wall portion, a projecting means on one of said first wall portions, a recess means in the other of said first wall portions for receiving said projecting means in the other of said first wall portions for receiving said projecting means thereby spacing said second wall portions apart, means insertable between said second wall portions for retaining said projecting means in said recess means, and means for retaining said insertable means between said second wall portions, wherein said cavity means includes said projecting means which projecting means projects inwardly of said cavity means from said cavity means first wall portion, and said boss includes said recess means, and wherein said means for retaining said insertable means between said second wall portions comprises an indent means on said insertable means and a detent means on said boss and matingly receivable in said indent means.

12. Apparatus according to claim 11 wherein said first and second structural members are hollow thin-walled members.

13. Apparatus according to claim 12 wherein said first and second structural members are composed of a blow-molded material.

14. Apparatus comprising first and second hollow-thin-walled structural members and means for attaching said structural members, said attaching means comprising at least one cavity means in said first member and a boss on said second member for being received in said cavity means, said cavity means having a pair of opposed wall portions spaced apart a first distance, said boss having a pair of opposed wall portions which are spaced apart a second distance which is less than said first distance, means on one of said cavity means wall portions and one of said boss wall portions for interlockingly attaching said structural members with the other of said boss wall portions being spaced from the other of said cavity means wall portions, and means insertable between said boss and said other of said cavity means wall portions for retaining said structural members in interlocking attachment with each other, wherein said insertable means comprises a member sized for being wedgingly received between the second wall portions when said projecting means is received in said recess means and wherein said means for retaining said insertable means between the second wall portions comprises indent means and a detent means matingly receivable in said indent means, said insertable means having one of said indent means and said detent means, and one of said structural members having the other of said indent means and said detent means.

15. Apparatus according to claim 14 wherein said first and second structural members are composed of a blow-molded material.

16. Apparatus according to claim 14 wherein said means for interlockingly attaching said structural members comprises a projecting means on one of said one of said cavity means wall portions and one of said boss wall portions and a recess means in the other of said one of said cavity means wall portions and one of said boss wall portions for receiving said projecting means, and wherein the respective wall portions are shaped to follow courses which define said projecting means and said recess means.

17. Apparatus according to claim 14 further comprising means for prying said insertable means from between the second wall portions whereby the attachment of said structural members may be released.

18. Apparatus according to claim 14 wherein each of said wall portions has a thickness which is less than about ⅜ inch.

19. A method of construction of an apparatus which includes first and second structural members which are releasably attachable, the method comprising:
- a. blow molding a hollowed first structural member to have a cavity having first and second opposed walls;
- b. blow molding a second structural member to have a hollowed boss which has first and second opposed walls;
- c. causing one of the first walls to follow a course which defines a projection;
- d. causing the other of the first walls to follow a course which defines a recess or receiving the projection;
- e. sizing the cavity, the boss, and the projection to allow insertion of the boss within the cavity so that the projection is received within the recess leaving the second walls spaced apart;
- f. providing a member for insertion between the second walls for retaining the projection in the recess; and
- g. forming a detent on one of the second walls and providing an indentation in the retaining member for engaging the detent for lockingly attaching the structural members.

20. A method of construction of an apparatus which includes first and second structural members which are releasably attachable, the method comprising:
- a. blow molding a hollowed first structural member to have a cavity having first and second opposed walls;
- b. blow molding a second structural member to have a hollowed boss which has first and second opposed walls;
- c. causing one of the first walls to follow a course which defines a projection;
- d. causing the other of the first walls to follow a course which defines a recess or receiving the projection;
- e. sizing the cavity, the boss, and the projection to allow insertion of the boss within the cavity so that the projection is received within the recess leaving the second walls spaced apart;
- f. providing a member for insertion between the second walls for retaining the projection in the recess; and
- g. providing a slot in the retaining member for engagement by a tip of a prying tool and forming a passage in one of the structural members for the prying tool.

* * * * *